United States Patent
Kim et al.

(10) Patent No.: US 10,812,151 B2
(45) Date of Patent: Oct. 20, 2020

(54) METHOD FOR TRANSMITTING AND RECEIVING SIGNAL BETWEEN BASE STATION AND VEHICLE TERMINAL IN DISTRIBUTED ANTENNA COMMUNICATION SYSTEM AND APPARATUS THEREFOR

(71) Applicant: LG Electronics Inc., Seoul (KR)

(72) Inventors: Heejin Kim, Seoul (KR); Jiwon Kang, Seoul (KR); Sunam Kim, Seoul (KR); Hanbyul Seo, Seoul (KR); Sangwook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/478,577

(22) PCT Filed: Jan. 23, 2018

(86) PCT No.: PCT/KR2018/001014
§ 371 (c)(1),
(2) Date: Jul. 17, 2019

(87) PCT Pub. No.: WO2018/143595
PCT Pub. Date: Aug. 9, 2018

(65) Prior Publication Data
US 2020/0052741 A1 Feb. 13, 2020

Related U.S. Application Data

(60) Provisional application No. 62/453,995, filed on Feb. 2, 2017.

(51) Int. Cl.
*H04B 7/04* (2017.01)
*H04B 7/0404* (2017.01)
(Continued)

(52) U.S. Cl.
CPC ......... *H04B 7/0404* (2013.01); *H04B 7/0417* (2013.01); *H04B 7/0874* (2013.01);
(Continued)

(58) Field of Classification Search
CPC .. H04B 7/0639; H04B 7/0695; H04B 7/0617; H04B 7/0456; H04B 7/0417;
(Continued)

(56) References Cited

U.S. PATENT DOCUMENTS

| 8,469,122 B2 * | 6/2013 | Perlman | H02J 50/23 |
| | | | 180/2.1 |
| 2005/0281226 A1 * | 12/2005 | Lee | H04L 1/0026 |
| | | | 370/329 |

(Continued)

FOREIGN PATENT DOCUMENTS

| WO | 2016175401 A1 | 11/2016 |
| WO | 2016190549 A1 | 12/2016 |

(Continued)

*Primary Examiner* — Emmanuel Bayard
(74) *Attorney, Agent, or Firm* — Dentons US LLP

(57) ABSTRACT

Disclosed in the present application is a method by which a terminal having a plurality of distributed antenna groups transmits and receives a signal in a wireless communication system. Particularly, the method comprises the steps of: calculating channel quality indicators for each of distributed antenna groups; selecting a preferred distributed antenna group among the distributed antenna groups on the basis of the channel quality indicators; and reporting information on the channel quality indicators to a base station, wherein the method further comprises a step for reporting information on the preferred distributed antenna group to the base station when the preferred distributed antenna group differs from the preselected specific distributed antenna group.

10 Claims, 9 Drawing Sheets

(51) Int. Cl.
*H04B 7/0417* (2017.01)
*H04B 7/08* (2006.01)
*H04L 1/00* (2006.01)
*H04W 52/36* (2009.01)
*H04W 52/42* (2009.01)

(52) U.S. Cl.
CPC ......... *H04L 1/0022* (2013.01); *H04W 52/365* (2013.01); *H04W 52/42* (2013.01)

(58) Field of Classification Search
CPC .. H04B 7/0413; H04B 7/0691; H04B 7/0874; H04B 7/0404
USPC .................................. 375/267, 299, 347–349
See application file for complete search history.

(56) References Cited

U.S. PATENT DOCUMENTS

| | | | | |
|---|---|---|---|---|
| 2008/0298519 | A1* | 12/2008 | Tsutsui | H01Q 3/30 375/345 |
| 2012/0134279 | A1 | 5/2012 | Tamaki | |
| 2012/0140649 | A1* | 6/2012 | Choudhury | H04W 24/10 370/252 |
| 2012/0182895 | A1* | 7/2012 | Jwa | H04W 72/046 370/252 |
| 2012/0224551 | A1* | 9/2012 | Ding | H04B 7/024 370/329 |
| 2014/0036797 | A1 | 2/2014 | Palanivelu et al. | |
| 2014/0241446 | A1* | 8/2014 | Zhang | H04B 7/0689 375/260 |
| 2014/0301297 | A1* | 10/2014 | Geirhofer | H04L 5/0053 370/329 |
| 2015/0049824 | A1* | 2/2015 | Kim | H04B 7/0456 375/267 |
| 2015/0092573 | A1 | 4/2015 | Zhang et al. | |
| 2015/0304003 | A1* | 10/2015 | Fujishiro | H04B 7/024 370/329 |
| 2015/0358920 | A1 | 12/2015 | Sorrentino et al. | |
| 2016/0119951 | A1* | 4/2016 | Mallik | H04L 5/001 370/329 |
| 2016/0323029 | A1* | 11/2016 | Cheng | H04B 7/0695 |
| 2017/0181132 | A1* | 6/2017 | Xiao | H04B 7/0626 |
| 2017/0195100 | A1* | 7/2017 | Kim | H04B 7/06 |
| 2018/0132217 | A1* | 5/2018 | Stirling-Gallacher | H04L 5/0053 |
| 2018/0139023 | A1* | 5/2018 | Li | H04L 5/0085 |
| 2018/0262250 | A1* | 9/2018 | Kim | H04B 17/309 |

FOREIGN PATENT DOCUMENTS

| | | |
|---|---|---|
| WO | 2016195205 A1 | 12/2016 |
| WO | 2016208837 A1 | 12/2016 |

* cited by examiner (a) Control-plane protocol stack (b) User-plane protocol stack (a)　　　　　　　　　　　　　　(b)

(a)

(b)

(c)

METHOD FOR TRANSMITTING AND RECEIVING SIGNAL BETWEEN BASE STATION AND VEHICLE TERMINAL IN DISTRIBUTED ANTENNA COMMUNICATION SYSTEM AND APPARATUS THEREFOR

This application is a National Stage Entry of International Application No. PCT/KR2018/001014 filed Jan. 23, 2018, which claims priority to U.S. Provisional Application No. 62/453,995 filed Feb. 2, 2017, all of which are incorporated herein by reference.

TECHNICAL FIELD

The present disclosure relates to a method of transmitting and receiving signals between a base station and a vehicle terminal in a distributed antenna communication system and apparatus therefor.

BACKGROUND ART

As an example of a mobile communication system to which the present disclosure is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE OF THE INVENTION

Technical Task

Based on the aforementioned discussion, the technical task of the present disclosure is to provide a method of transmitting and receiving signals between a base station and a vehicle terminal in a distributed antenna communication system and apparatus therefor.

Technical Solutions

In one technical aspect of the present disclosure, provided herein is a method of transmitting/receiving a signal by a user equipment having a plurality of distributed antenna groups in a wireless communication system, the method including computing channel quality indicators for the distributed antenna groups, respectively, selecting a preferred distributed antenna group from the distributed antenna groups based on the channel quality indicators, reporting information on the channel quality indicators to a base station, and if the preferred distributed antenna group is different from a previously selected specific distributed antenna group, reporting the information on the preferred distributed antenna group to the base station.

In another technical aspect of the present disclosure, provided herein is a user equipment in a wireless communication system, the user equipment including a plurality of distributed antenna groups and a processor connected to a plurality of the distributed antenna groups, wherein the processor is configured to select a preferred distributed antenna group from the distributed antenna groups based on channel quality indicators computed for the distributed antenna groups, respectively, report information on the channel quality indicators to a base station, and if the preferred distributed antenna group is different from a previously selected specific distributed antenna group, report the information on the preferred distributed antenna group to the base station.

Preferably, if the preferred distributed antenna group is different from the previously selected specific distributed antenna group, an aperiodic uplink reference signal including a Modulation and Coding Scheme (MCS) change request message may be transmitted to the base station.

Moreover, the information on the preferred distributed antenna group may be reported together with the channel quality indicators. And, the information on the preferred distributed antenna group may include a 1-bit indicator indicating that the preferred distributed antenna group is different from the previously selected specific distributed antenna group.

Additionally, if the preferred distributed antenna group is different from the previously selected specific distributed antenna group, a Power Headroom Report (PHR) for the preferred distributed antenna group may be transmitted to the base station.

Advantageous Effects

According to an embodiment of the present disclosure, a base station and a user equipment in a distributed antenna communication system can share or provide informations proposed by the embodiments of the present disclosure more efficiently.

The effects that can be achieved through the embodiments of the present disclosure are not limited to what has been particularly described hereinabove and other effects which are not described herein can be derived by those skilled in the art from the following detailed description.

BEST MODE FOR INVENTION

Hereinafter, structures, operations, and other features of the present disclosure will be readily understood from the embodiments of the present disclosure, examples of which are illustrated in the accompanying drawings. Embodiments described later are examples in which technical features of the present disclosure are applied to a 3GPP system.

Although the embodiments of the present disclosure are described using a long term evolution (LTE) system and a LTE-advanced (LTE-A) system in the present specification, they are purely exemplary. Therefore, the embodiments of the present disclosure are applicable to any other communication system corresponding to the above definition. In addition, although the embodiments of the present disclosure are described based on a frequency division duplex (FDD) scheme in the present specification, the embodiments of the present disclosure may be easily modified and applied to a half-duplex FDD (H-FDD) scheme or a time division duplex (TDD) scheme.

Moreover, in the present specification, a name of a base station can be used as an inclusive term including RRH (remote radio head), eNB, TP (transmission point), RP (reception point), relay, etc.

Figure 1:
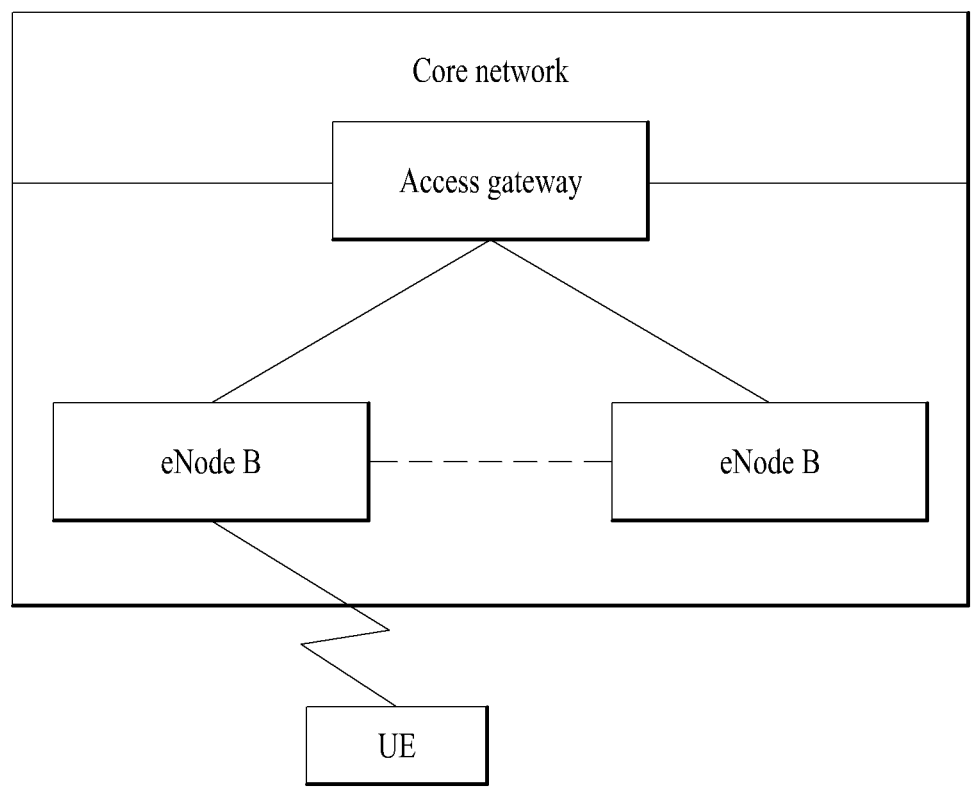
FIG. 1 is a diagram showing a network structure of an Evolved Universal Mobile Telecommunications System (E-UMTS) as an example of a wireless communication system.
Figure 2:
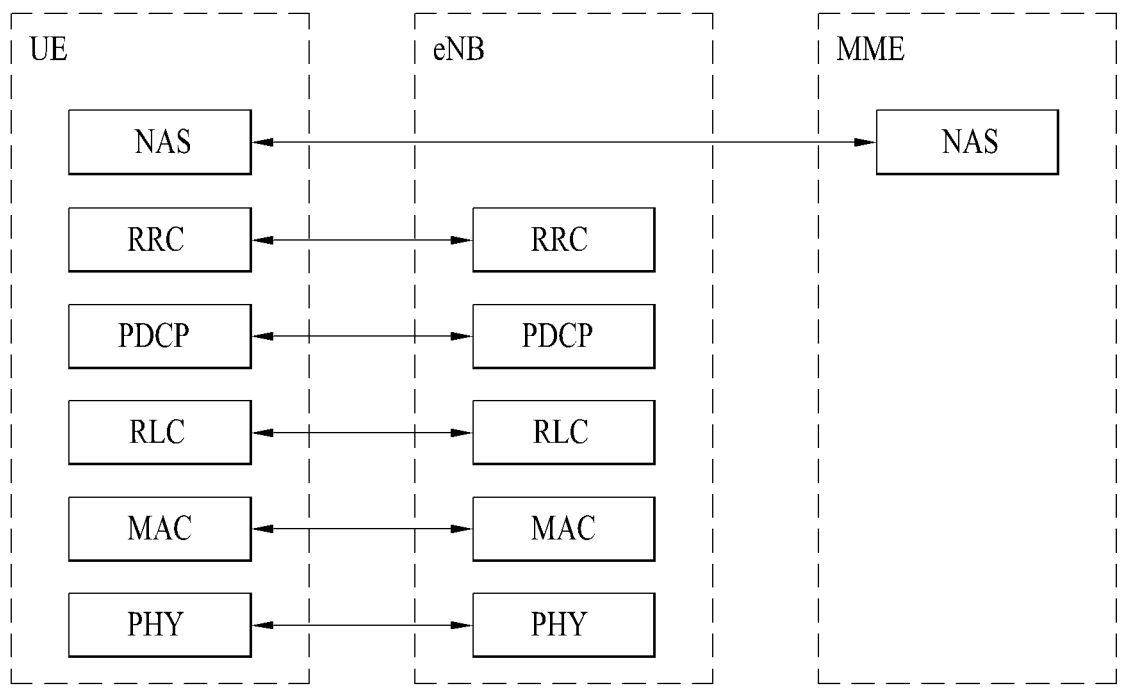
FIG. 2 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.
Figure 2:
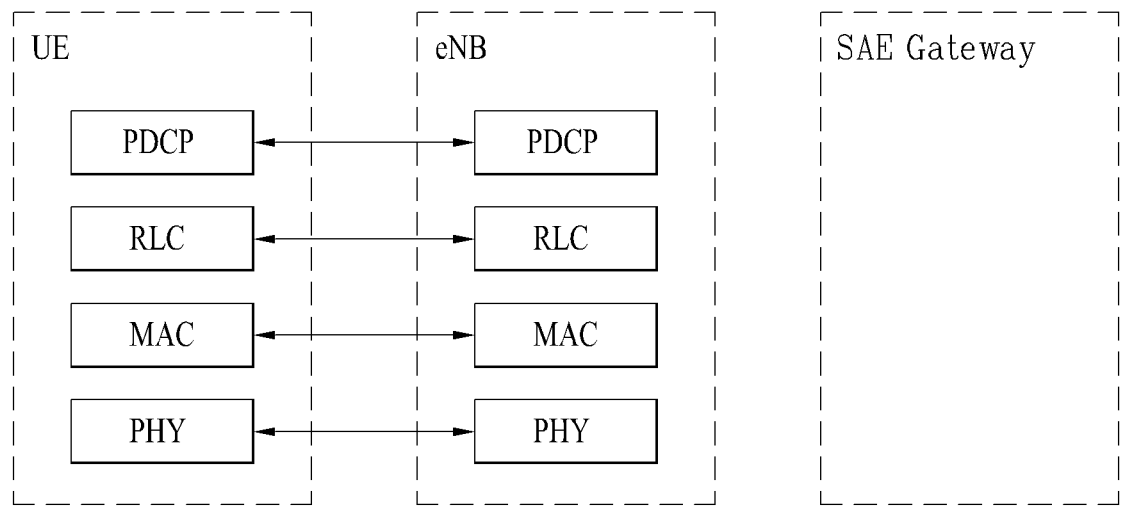

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer, which is a first layer, provides an information transfer service to a higher layer using a physical channel. The PHY layer is connected to a Medium Access Control (MAC) layer located on a higher layer via a transport channel. Data is transported between the MAC layer and the PHY layer via the transport channel Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer, which is an upper layer, through a logical channel. The RLC layer of the second layer supports reliable data transmission. A function of the RLC layer may be implemented as a function block within MAC. A Packet Data Convergence Protocol (PDCP) layer of the second layer performs a header compression function of reducing unnecessary control information in order to efficiently transmit IP packet such as IPv4 or IPv6 on a radio interface having a narrow bandwidth.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other. In case that 'RRC connected' exists between a RRC layer of a UE and a RRC layer of a network, the UE is in RRC connected mode. Otherwise, the UE is in idle mode. A Non-Access Stratum layer over the RRC layer performs functions such as session management, mobility management and the like.

One cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
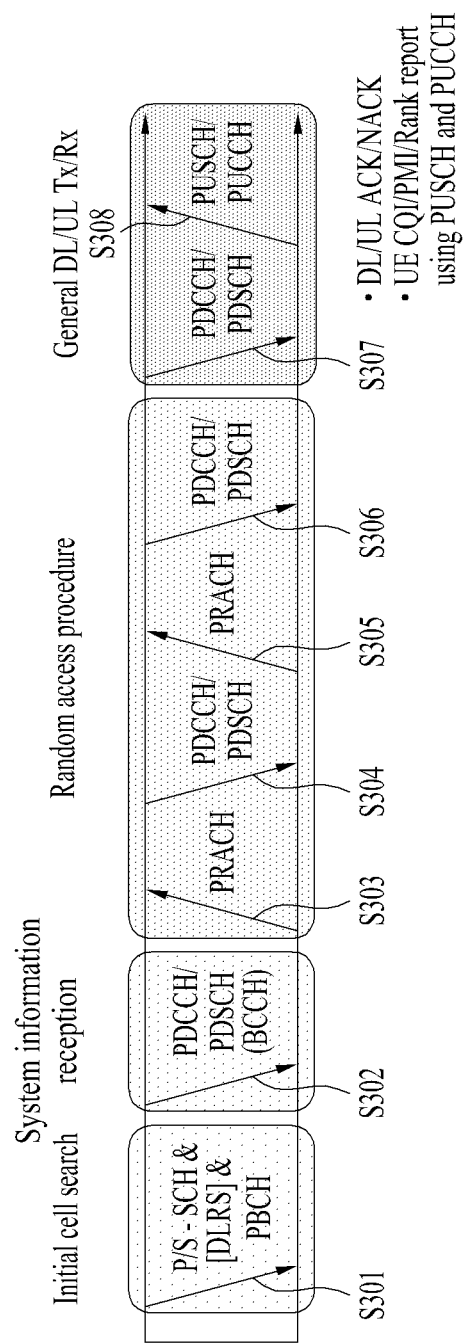
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303), and receive a response message to the preamble through the PDCCH and the PDSCH corresponding thereto (S304 and S306). In case of contention based RACH, a contention resolution procedure may be further performed.

The UE which has performed the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

Figure 4:
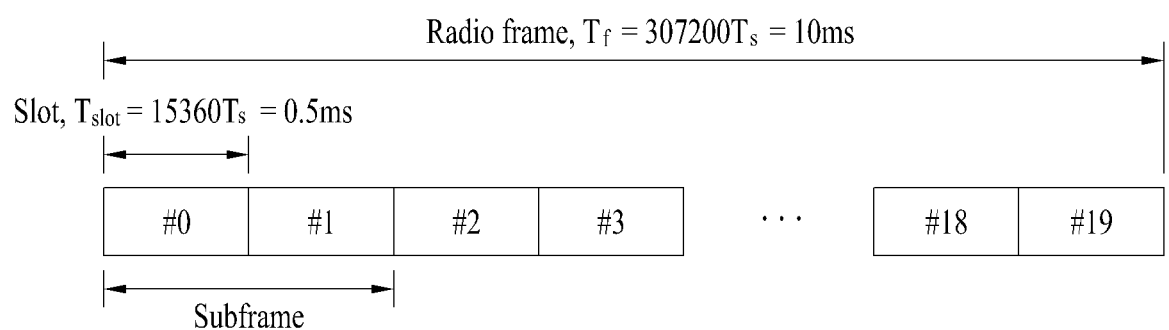
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each subframe has a length of 1 ms and includes two slots. Each slot has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
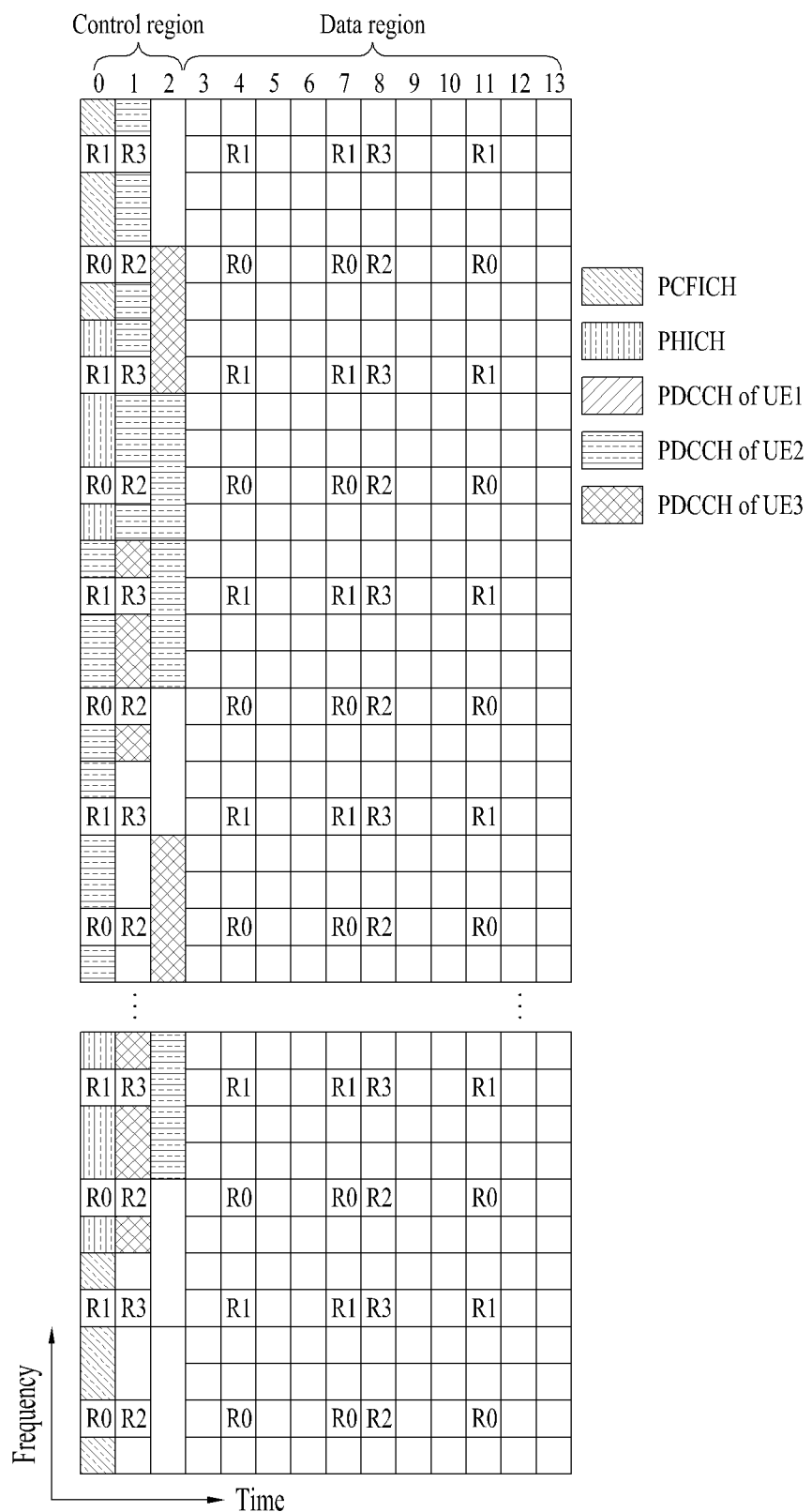
FIG. 5 is a diagram showing the structure of a downlink radio frame used in a Long Term Evolution (LTE) system.

FIG. 5 is a diagram showing the structure of a downlink radio frame used in a Long Term Evolution (LTE) system.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 6:
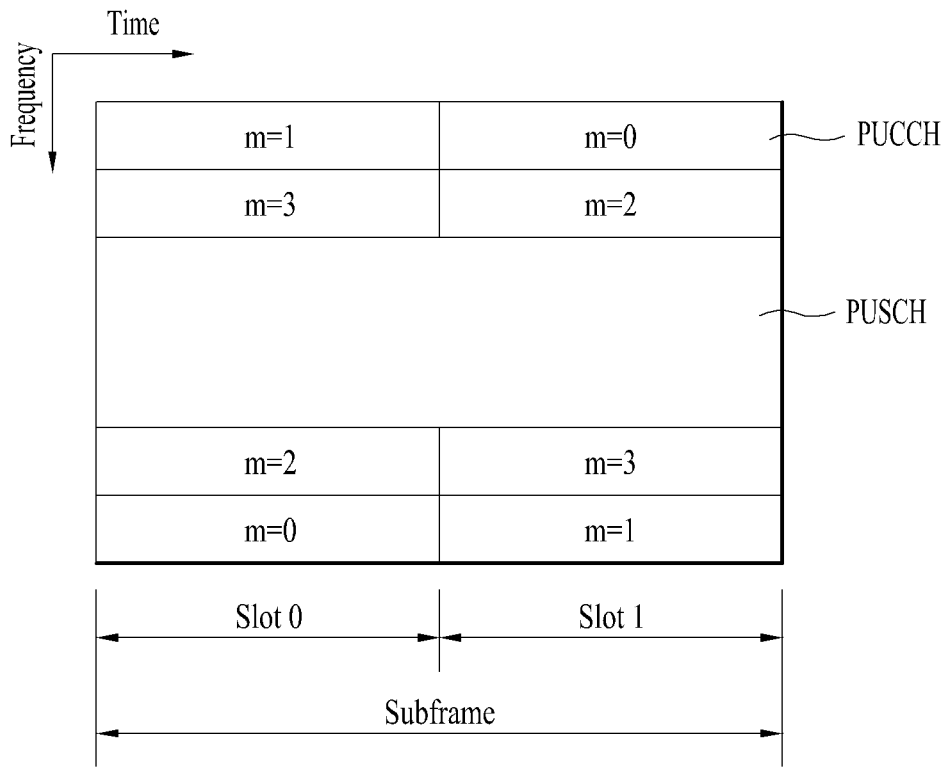
FIG. 6 is a diagram showing the structure of a uplink radio frame used in a Long Term Evolution (LTE) system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

Hereinafter, an MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
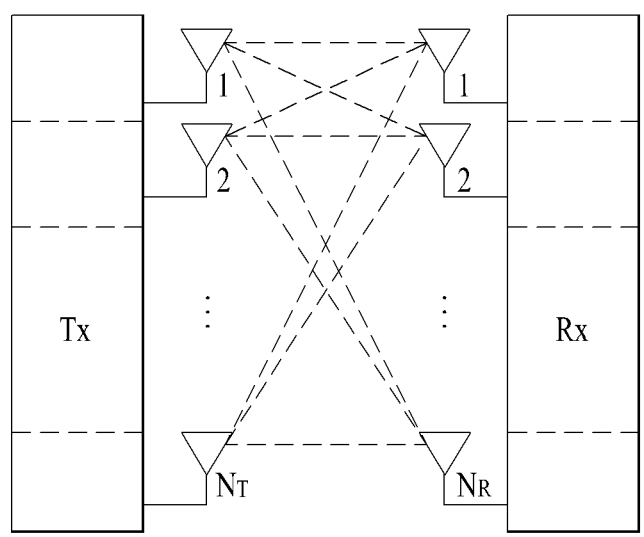
FIG. 7 is a diagram showing the configuration of a general multi-antenna (MIMO) communication system.

The configuration of a general MIMO communication system is shown in FIG. 7. A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where $R_i$ is the smaller of $N_T$ and $N_R$.

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, $3^{rd}$ generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

A vehicle-to-vehicle communication system based on the aforementioned wireless communication system is described as follows.

Figure 8:
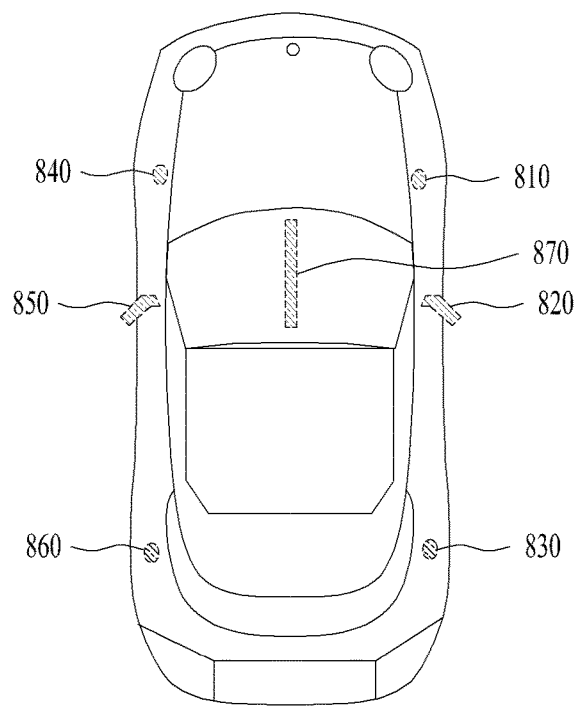
FIG. 8 is a diagram showing a vehicle including a multitude of antenna arrays.
Figure 8:
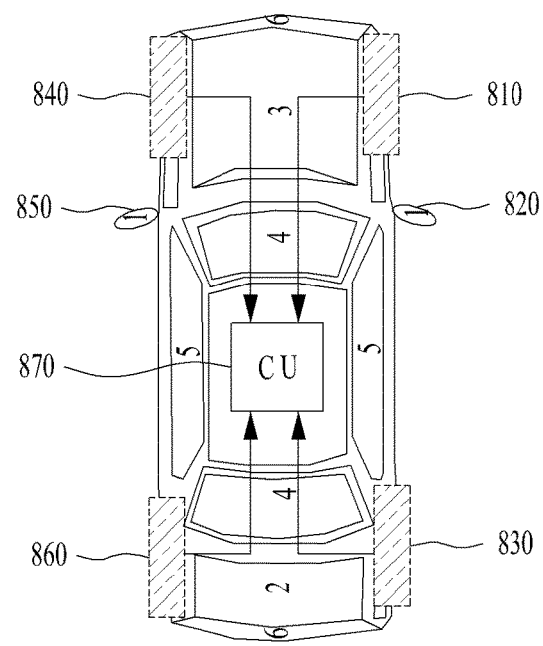

FIG. 8 is a diagram showing a vehicle including a multitude of antenna arrays. The use frequency of the aforementioned wireless communication system and the category of the utilization services of the aforementioned wireless communication system are increasing. In doing so, unlike the existing static service, the needs for supporting or providing high QoS (Quality of Service) to a fast moving User Equipment (UE) or user together with high data throughput or high data rate are rising.

For example, the need for a wireless communication system to provide a wireless service of a good quality to currently moving UEs is increasing in case that a multitude of UEs or users (hereinafter commonly called UEs) using public transportation want to watch multimedia while on board, that a multitude of UEs on a personal vehicle currently driving a highway use different wireless communication services, respectively, or the like.

Yet, the existing wireless communication system may have restrictions put on providing a service to a UE in consideration of fast moving or mobility. In this case, for the service support, a system network bees to be improved on a revolution level. Moreover, it may be necessary to design a new system within a range of not affecting the existing network infrastructure while maintaining the compatibility with the existing network infrastructure.

For example, as a vehicle obtains a large array gain by having a large size antenna array installed therein, UEs within the vehicle can be provided with a service of good quality even in a fast moving situation. In doing so, in case of using the large size antenna array, the vehicle can avoid communication performance degradation due to a penetration loss having an average value of about 20 dB. Moreover, since a vehicle uses Rx antennas in comparison with a UE, it may be easy to secure a large size gain. And, it is able to secure Rx diversity through securing a long distance between Rx antennas. Namely, it is possible to provide a service to a fast moving UE without an additional design of a network through the aforementioned vehicle-to-vehicle MIMO system.

Yet, despite the above-described advantages, it is still difficult to apply a vehicle-to-vehicle MIMO system due to vehicle exterior, vehicle manufacturing system establishment, etc. Moreover, a vehicle is a considerably expensive equipment in comparison with the existing personal portable communication equipment and may have difficulty in improvement and update. Since a vehicle needs to meet more requirements such as design concept, aerodynamic structure and the like as well as communication performance, there may be limitations put on the aesthetic/aerodynamic vehicle design. For example, some vehicle manufacturers currently use a combined antenna having performance poorer than that of a single antenna in order to remove the visual inconvenience provided by the existing antenna.

Yet, in order to resolve the spatial limitation of a large size antenna array in an environment in which development and necessity of a communication system are on the rise, a distributed antenna array system for multiple antenna arrays system implementation tends to be installed in a vehicle and employed in consideration of harmony with an exterior of the vehicle and the like.

For example, referring to FIG. 8, a plurality of antennas 810, 820, 830, 840, 850 and 860 may be installed in a vehicle. Here, positions and the number of a plurality of the antennas 810, 820, 830, 840, 850 and 860 may vary depending on a vehicle design system and each vehicle. In this case, the configuration mentioned in the following may be identically applicable despite the positions and number of a plurality of the antennas 810, 820, 830, 840, 850 and 860 installed in the vehicle are changed, which is non-limited to the following embodiment. Namely, in the following description, the configuration is applicable to antennas having various shapes and radiation patterns according to the positions of a plurality of the antennas 810, 820, 830, 840, 850 and 860.

In this case, signals for antennas [e.g., DUs (distributed antenna units) or RUs (remote units)] disposed on each vehicle can be controlled through a central control unit (CU) 870. Namely, the CU 870 of the vehicle controls signals for the RUs 810, 820, 830, 840, 850 and 860 installed in the vehicle, it is able to receive a signal by maximizing reception diversity from a base station and avoid wireless disconnection between the base station and the vehicle in a fast moving situation. Namely, the vehicle itself may be a single UE having a plurality of antennas or a relay UE that relays signals. The vehicle can provide a service of god quality to a plurality of UEs within the vehicle through the control and relay of the signals received through the CU 870.

In aspect of functional/hierarchical aspect of communication, a UE generally includes an RRH including a Radio Frequency (RF) module and an Analog Digital Converter/Digital Analog Converter (ADC/DAC), a modem (PHY, MAC, RLC, PDCP, RRC and NAS included), and an Application Processor (AP). A function of the part named DU in the vehicle distributed antenna system has no reason to be responsible only for a role of an antenna (RF or RRH) module generally called with respect to function/hierarchy of the UE. This is because it is possible to perform a specific processing by giving some of functions of the UE to each DU/RU additionally as well as the function of the RF module and combine to process the processed signal by drawing the processed signal from the DU/RU to the CU. Therefore, in case of a vehicle antenna system, by appropriately distributing and assigning functional/hierarchical modules of a UE to the DU/RU and the CU, the level of difficulty of RF implementation can be lowered or an implementation gain of resolving a DU-CU cabling issue and the like can be obtained.

Figure 9:
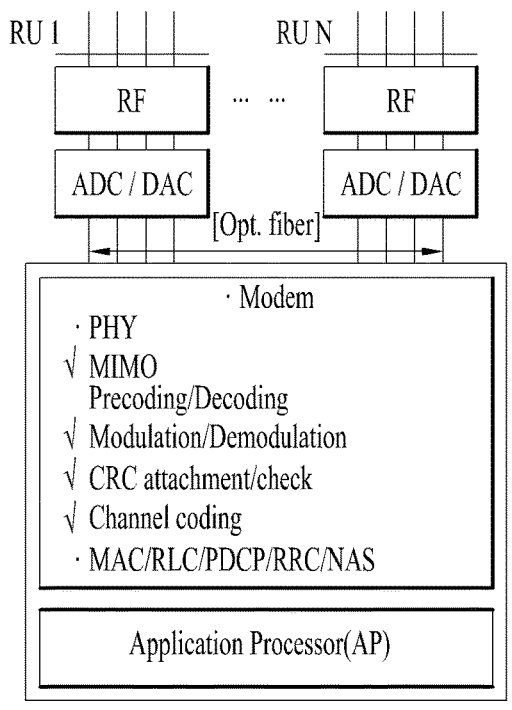
FIG. 9 is a diagram showing examples of function sharing between RU and CU in a vehicle MIMI system.
Figure 9:
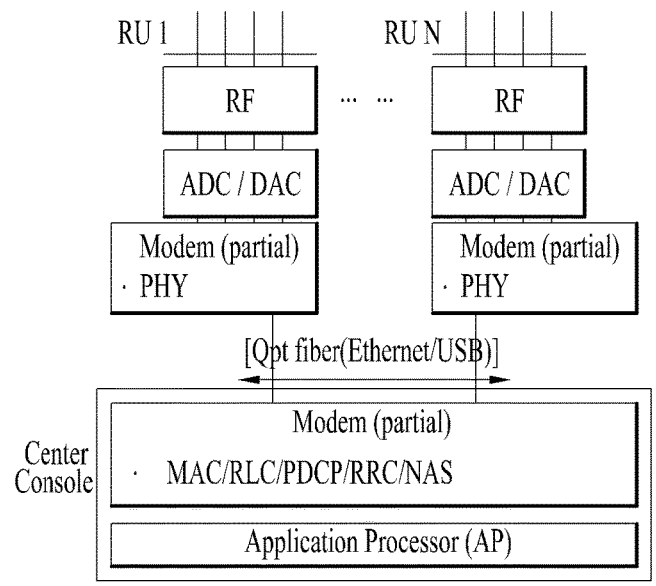
Figure 9:
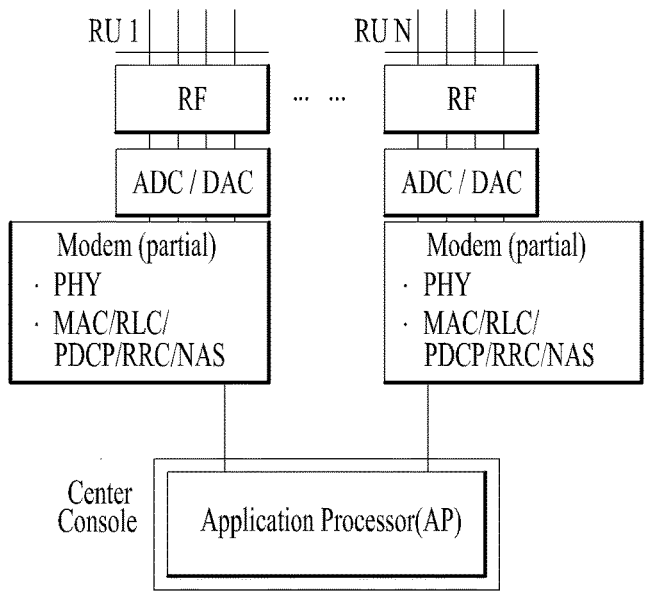

FIG. 9 is a diagram showing examples of function sharing between RU and CU in a vehicle MIMI system.

Particularly, FIG. 9(a) shows that implementation may be facilitated by RU function simplification and also shows the feature that implementation is possible by re-utilizing functions of an existing modem. Moreover, FIG. 9(b) and FIG. 9(c) shows examples of implementation that each DU has a minimum function of a modem, e.g., a function of a physical layer (PHY layer) in an implementation scenario according to function/hierarchy module distribution between RU and CU.

Particularly, referring to FIG. 9(b) and FIG. 9(c), since a physical layer operation is performed per individual RU, control information including an uplink/downlink grant is provided per RU and data is reconstructed per RU as well. Thus, such system operation is possible.

Meanwhile, the present disclosure proposes a signaling between a base station and a vehicle terminal for a vehicle MIMO system. Particularly, it is advantageous to design a system in a manner that the introduction of a vehicle terminal enables a base station to perform a unified operation without recognizing whether an individual vehicle terminal is a centralized antenna vehicle terminal or a distributed antenna vehicle terminal.

Therefore, when a vehicle distributed antenna system is considered, additionally required signaling between a base station and a vehicle terminal may be generated from RF switching according to an RU selection operation at CU. For example, a vehicle terminal may perform RU selection at CU based on a driving route and position of its own and a received signal quality measurement value history at individual RU(s) and is able to make an NCS change request, a Transmit power change request and the like to a base station for the communication performance improvement based on the above informations.

First Embodiment

According to a first embodiment of the present disclosure, a distributed antenna vehicle terminal can receive a delivery of a received signal quality of an individual RU (e.g., Received Signal Strength Indication (RSSI), etc.) from each RU. Based on this, when the vehicle terminal reports Channel Status Information (CSI), the vehicle terminal may report a plurality of per-RU CUIs to a base station and also report an index of an RU selected by an RU selector of a CU, i.e., an RU determined as appropriate for performing communication with the base station.

In particular, a vehicle terminal can make a request for MCS assignment appropriate for a UE situation to a baser station by reporting a plurality of CQIs per RU and a selected RU index together in CSI reporting. For example, a distributed antenna vehicle terminal having 2 RUs can configure a CQI set with per-RU CQI and an index of a selected RU (e.g., index 1 or index 2 through CSI reporting. For example, a CQI set is configured with {CQI1, CQI2, selected RU index}. Yet, it does not mean that the CQI set should be always reported at the same CSI report timing. It means that a CSI feedback field can be extended only not by a per-UE single CQI reporting but by a combination of a plurality of CQIs and RU indexes. And, the individual values can be reported to the base station at different report timings and/or by different periods.

Moreover, if an RU selected by an RU selector of a distributed antenna vehicle terminal is changed or estimated as it will be changed, for the purpose of an MCS change request, the distributed antenna vehicle terminal may explicitly indicate RU index information that will be changed irrespective of its CSI reporting period or separately indicate a presence or non-presence of change of RU through 1-bit indicator. In this case, the RU index information and the indicator indicating a presence or non-presence of the change may be represented as one of an RACH sequence and/or an SRS sequence or implemented in a manner of adding bits to the corresponding sequence. If the UE provides the per-RU CQI and the RU selection information to the base station according to the above-described scheme, the base station determines MCS with reference to the reported CQI.

Meanwhile, a UE side can operate in a manner of making an MCS change request by reporting a CQI of an RU having a poorest channel gain or in a manner of calculating a single CQI with reference to an averaged reception power of a plurality of RUs and then reporting it to a base station. In this case, it is advantageous in that the base station does not need to operate by distinguishing whether this UE is a distributed antenna UE or a centralized antenna UE.

Second Embodiment

According to a second embodiment of the present disclosure, when a distributed antenna vehicle terminal estimates that an RU selected by an RU selector of a CU is changed or will be changed in uplink communication, it is able to transmit a Power Headroom Report (PHR) to a base station according to the selection of the RU.

In particular, in case of estimating that the RU is changed or will be changed, the distributed antenna vehicle terminal transmits the PHR to the base station, thereby making a request for reallocation of resource and transmit power. For example, by reporting PHR with reference to an RU having a poorest channel gain or calculating to report an average PHR value of a plurality of RUs to the base station, communication performance can be improved.

Meanwhile, in case that an individual Phase Locked Loop (PLL) is installed per RU in a distributed antenna vehicle terminal, time offsets and/or frequency offsets generated from antenna ports per RU may differ from each other. Here, since a timing delay generated from a transmission from an individual RU to a CU differs due to such a factor as a difference of distance between each RU and CU, an RU-CU interface, etc., an inter-RU timing error may occur. For example, since signals generated by each RU are inputted to a CU in a situation that PLL is implemented per RU independently, it is highly probable that frequency error between antenna ports or port groups will occur even in a single UE. Hence, a distributed antenna vehicle terminal reports performance information on a frequency or timing error between antenna ports of its own to a base station in advance, thereby improving uplink/downlink data transmission performance of its own.

Third Embodiment

According to a third embodiment of the present disclosure, a distributed antenna vehicle terminal reports performance information on a timing or frequency error between antennas grouped into a plurality of RUs to a base station, the base station applies a precoding suitable for a UE situation or selects a transmission mode. Namely, if the base station is able to obtain performance information on a timing or frequency error per antenna port group included in each RU, the base station may apply a precoding suitable for a UE situation or switch a transmission mode.

For example, if a base station receives a signaling, which indicates a vehicle distributed antenna UE having occurrence of an inter-RU frequency error, from a UE in downlink communication, the base station can switch a transmission mode to perform an open-loop transmission based on the received signaling. For another example, if a base station receives a signaling, which indicates a vehicle distributed antenna UE having occurrence of a frequency error, from a UE in an uplink communication situation, the base station can consider applying a diversity scheme in a manner of applying antenna port virtualization on an antenna group having a similar frequency offset, e.g., an antenna group belonging to the same RU on the basis of an SRS measurement value of its own based on the received signaling.

Whether the base station having received such signaling will apply a prescribed transmission scheme or precoding for communication performance improvement can be by various methods, and no limitation is put on such methods.

Figure 10:
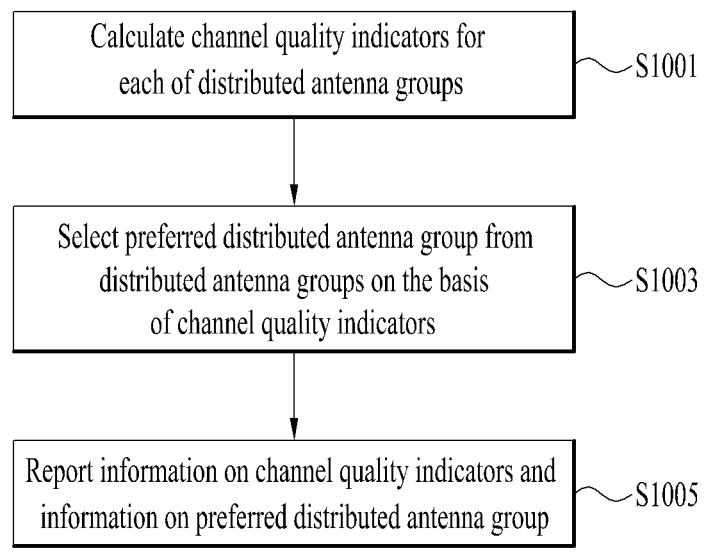
FIG. 10 is a diagram showing an example that a user equipment having a plurality of distributed antenna groups transmits/receives signals to/from a base station according to an embodiment of the present disclosure.

FIG. 10 is a diagram showing an example that a User Equipment (UE) having a plurality of distributed antenna groups transmits/receives signals to/from a base station according to an embodiment of the present disclosure. Particularly, a plurality of distributed antenna groups mean the aforementioned RUs. In the following description, 'processed by a UE' means 'processed by the aforementioned CU.

Referring to FIG. 10, in a step 1001, using signal quality information such as Received Signal Strength Indication (RSSI) provided from RUs, channel quality indicators for the distributed antenna groups are computed, respectively. In a step 1003, a UE selects a prescribed distributed antenna group from the distributed antenna groups based on the channel quality indicators. For clarity of the following description, the selected prescribed distributed antenna group is assumed as a preferred antenna group. Of course, to prevent the works case of scenario, an antenna group having the poorest channel quality may be selected.

Subsequently, in a step 1005, the UE reports information on the channel quality indicators to a base station. Particularly, in this case, if the preferred distributed antenna group is different from a previously selected specific distributed antenna group, information on the preferred distributed antenna group is preferably reported to the base station as well. Particularly, the information on the preferred distributed antenna group may be reported together with the channel quality indicators, by which the present disclosure is non-limited. As described above, such information may be reported to the base station at different repotting timings and/or by different periods.

For example, if the preferred distributed antenna group is different from the previously selected specific distributed antenna group, an aperiodic uplink reference signal including a Modulation and Coding Scheme (MCS) change request message may be transmitted to the base station. And, such an MCS change request message may be substituted for the information on the preferred distributed antenna group. Of course, the information on the preferred distributed antenna group may include a 1-bit indicator indicating that the preferred distributed antenna group is different from the previously selected specific distributed antenna group.

Additionally, if the preferred distributed antenna group is different from the previously selected specific distributed antenna group, Power Headroom Report (PHR) for the preferred distributed antenna group is preferably transmitted to the base station [not shown in FIG. 10].

The above-described embodiments are combinations of elements and features of the present disclosure in a predetermined manner Each of the elements or features may be considered selective unless mentioned otherwise. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present disclosure can be implemented by various means, for example, hardware, firmware, software, or combinations thereof. In the case of a hardware configuration, the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present disclosure may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the aforementioned method of transmitting and receiving signals between a base station and a vehicle terminal in a distributed antenna communication system and apparatus therefor are described by focusing on examples applying to the 3GPP LTE system, they are applicable to various wireless communication systems as well as to the 3GPP LTE system.

What is claimed is:

1. A method of transmitting/receiving a signal by a user equipment having a plurality of distributed antenna groups in a wireless communication system, the method comprising:

computing channel quality indicators for the distributed antenna groups, respectively;

selecting a preferred distributed antenna group from the distributed antenna groups based on the channel quality indicators;

reporting information on the channel quality indicators to a base station; and based on the preferred distributed antenna group being different from a previously selected specific distributed antenna group, reporting information on the preferred distributed antenna group to the base station.

2. The method of claim 1, further comprising, based on the preferred distributed antenna group being different from the previously selected specific distributed antenna group, transmitting an aperiodic uplink reference signal including a Modulation and Coding Scheme (MCS) change request message to the base station.

3. The method of claim 1, wherein the information on the preferred distributed antenna group is reported together with the channel quality indicators.

4. The method of claim 1, wherein the information on the preferred distributed antenna group comprises a 1-bit indicator indicating that the preferred distributed antenna group is different from the previously selected specific distributed antenna group.

5. The method of claim 1, further comprising, based on the preferred distributed antenna group being different from the previously selected specific distributed antenna group, transmitting a Power Headroom Report (PHR) for the preferred distributed antenna group to the base station.

6. A user equipment in a wireless communication system, the user equipment comprising:

a plurality of distributed antenna groups; and a processor connected to a plurality of the distributed antenna groups, wherein the processor is configured to select a preferred distributed antenna group from the distributed antenna groups based on channel quality indicators computed for the distributed antenna groups, respectively, report information on the channel quality indicators to a base station, and based on the preferred distributed antenna group being different from a previously selected specific distributed antenna group, report information on the preferred distributed antenna group to the base station.

7. The user equipment of claim 6, wherein based on the preferred distributed antenna group being different from the previously selected specific distributed antenna group, the processor transmits an aperiodic uplink reference signal including a Modulation and Coding Scheme (MCS) change request message to the base station.

8. The user equipment of claim 6, wherein the information on the preferred distributed antenna group is reported together with the channel quality indicators.

9. The user equipment of claim 6, wherein the information on the preferred distributed antenna group comprises a 1-bit indicator indicating that the preferred distributed antenna group is different from the previously selected specific distributed antenna group.

10. The user equipment of claim 6, wherein based on the preferred distributed antenna group being different from the previously selected specific distributed antenna group, the processor transmits a Power Headroom Report (PHR) for the preferred distributed antenna group to the base station.

* * * * *